United States Patent [19]
Kim et al.

[11] Patent Number: 5,572,497
[45] Date of Patent: Nov. 5, 1996

[54] SINGLE MOTOR DRIVING DEVICE FOR A MINI-DISC PLAYER

[75] Inventors: Kwang Kim; Heui S. Seo, both of Seoul, Rep. of Korea

[73] Assignee: Goldstar Co., Ltd., Seoul, Rep. of Korea

[21] Appl. No.: 356,463

[22] Filed: Dec. 15, 1994

[30] Foreign Application Priority Data

Dec. 29, 1993 [KR] Rep. of Korea .................. 30966/1993

[51] Int. Cl.⁶ ............................. G11B 17/04; G11B 5/54; G11B 21/02
[52] U.S. Cl. .................... 369/77.2; 369/75.2; 360/99.03; 360/99.07
[58] Field of Search .............................. 369/13, 54, 75.1, 369/75.2, 77.1, 77.2, 78; 360/104, 105, 98.04, 98.06, 99.02, 99.03, 99.06, 99.07, 106

[56] References Cited

U.S. PATENT DOCUMENTS

| | | | |
|---|---|---|---|
| 4,602,361 | 7/1986 | Kumaki et al. | 369/77.2 |
| 5,119,361 | 6/1992 | Tanabe | 369/121 |
| 5,130,869 | 7/1992 | Kikuya et al. | 369/77.2 |
| 5,202,863 | 4/1993 | Miyatake et al. | 360/104 |
| 5,224,079 | 6/1993 | Inoue | 369/77.2 |
| 5,229,900 | 7/1993 | Arai et al. | 369/77.2 |
| 5,268,882 | 12/1993 | Mukawa | 360/105 |
| 5,438,465 | 8/1995 | Noda | 360/109 |

FOREIGN PATENT DOCUMENTS

| | | | |
|---|---|---|---|
| 60-70547 | 4/1985 | Japan | 369/77.1 |
| 61-70955 | 8/1986 | Japan | 369/77.1 |
| 3-283047 | 12/1991 | Japan | 369/77.2 |
| 5-325375 | 12/1993 | Japan . | |

*Primary Examiner*—Stuart S. Levy
*Assistant Examiner*—David L. Ometz
*Attorney, Agent, or Firm*—Fish & Richardson PC

[57] ABSTRACT

A driving device for a mini-disc player, which can carry out loading and unloading of a disc, operation of a pick up, and loading and unloading of a magnetic head using only one motor. The driving device includes, a driving part having a motor fixed on a deck and a gear train, a cam having a cam groove formed therein driven by the motor, a disc loading means having one end thereof inserted in the cam groove for varying its position following rotation of the cam, a pick up operation part for operating a pick up by the rotation of the cam continued after completion of the disc loading by the disc loading means, and a magnetic head loading part moved interlocked with the rotation of the cam.

11 Claims, 11 Drawing Sheets

SINGLE MOTOR DRIVING DEVICE FOR A MINI-DISC PLAYER

FIELD OF THE INVENTION

This invention relates to a portable mini-disc player, more particularly to a driving device for a mini-disc player, which can carry out loading and unloading of a disc, operation of a pick up, and loading and unloading of a magnetic head using only one motor.

DESCRIPTION OF THE PRIOR ART

A portable mini-disc player is an apparatus for recording or reproducing information on or from a compact mini-disc with an optical pick up while rotating the disc. It is essential to make the portable mini-disc player small and thin for the convenience of carrying.

Figure 1:
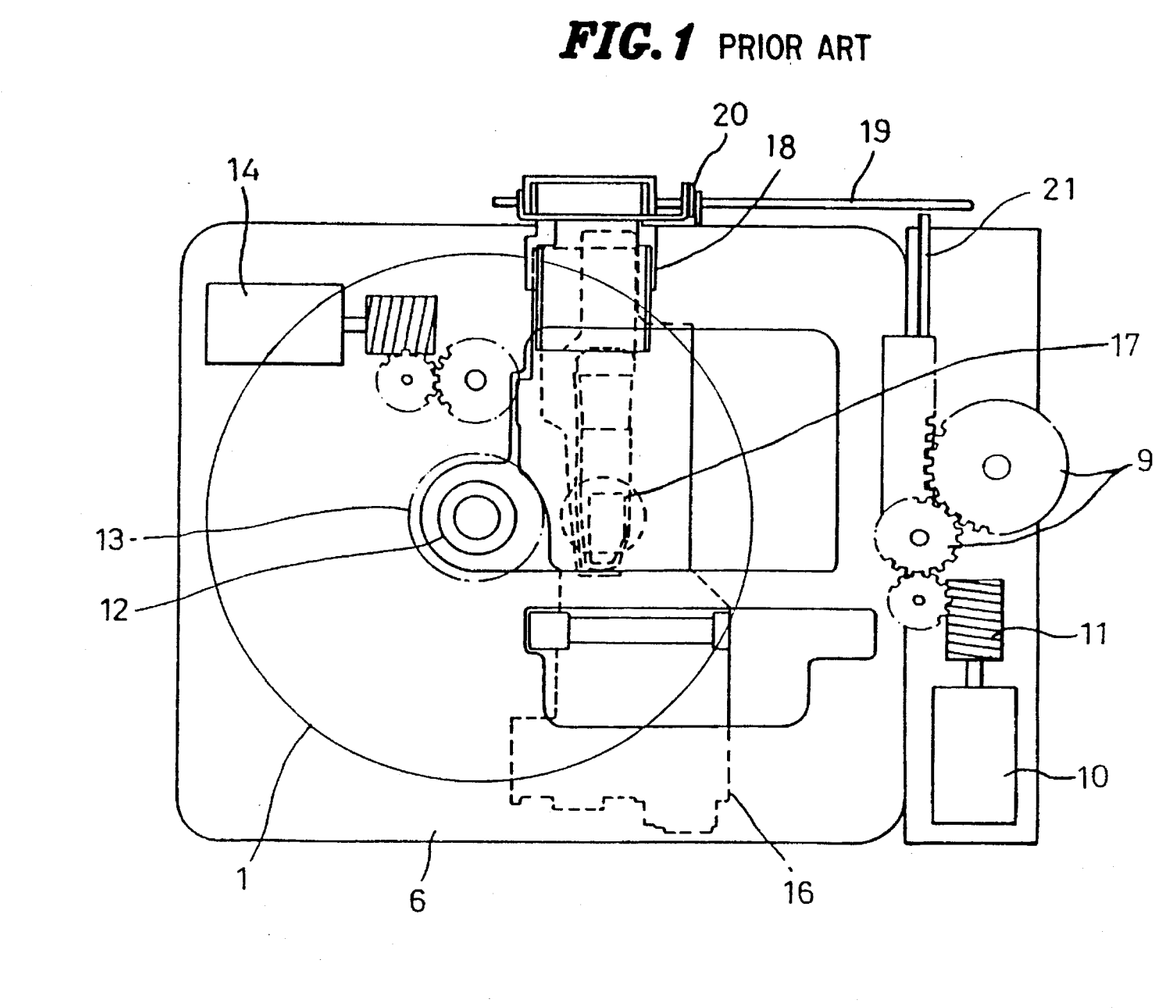
FIG. 1 is a plan view of a conventional mini-disc player.

The attached drawing FIG. 1 is a plan view of a conventional mini-disc player. The mini-disc player records information on a recording medium utilizing a thermo-magnetic property of the recording medium and reproduces the recorded information from the recording medium utilizing the optical property accompanying direction of the recorded magnetic field.

The mini-disc player includes a disc loading part for loading and unloading a disc, a pick up operation part for reproducing information from the loaded disc, a magnetic head loading part for recording information on the disc, and a disc rotating part for rotating the disc.

Figure 2:
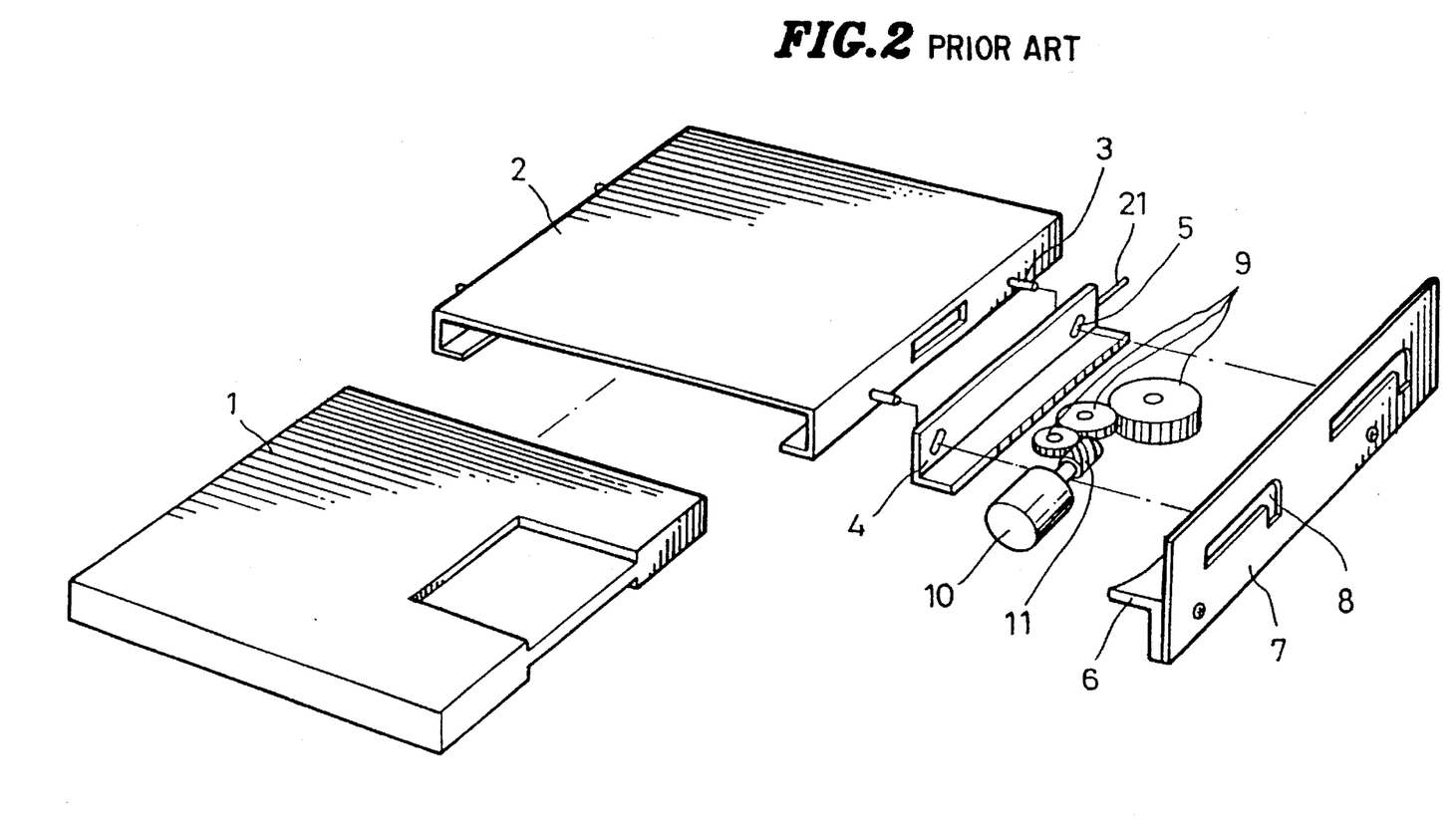
FIG. 2 is a perspective view of a conventional disc loading part at disassembly.

Referring to FIGS. 1 and 2, a front loading process, i.e., a process for loading a disc by inserting it from the front of the body is to be explained hereinafter.

As shown in FIG. 2, there is one pair of projections 3 on both sides of a cartridge guide bracket 2 into which a disc 1 is to be inserted. The projections are inserted into slits 8 of a guide plate 7 through sloped slits 5 of a power transmission rack 4. The guide plate 7 has been fixed to both sides of a deck 6. A gear train 9 is connected to the power transmission rack 4, and one end of which gear train 9 is engaged to a worm gear 11 rotated by a loading motor 10.

Figure 3A:
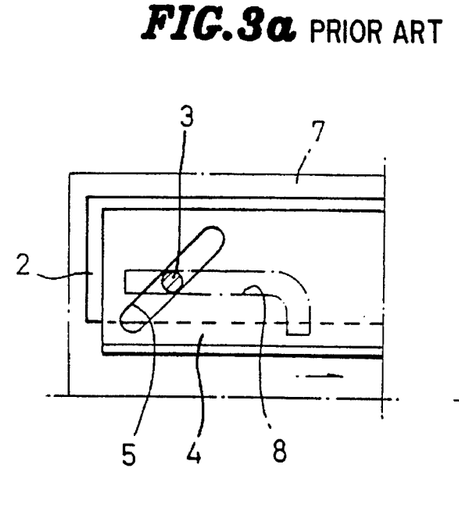
FIGS. 3(a) and 3(b) are side views showing operation of the disc loading part of FIG. 2.

With the foregoing arrangement, as shown in FIG. 3(a), when the cartridge guide bracket 2 with a disc 1 loaded therein is positioned at an inlet of the deck 6, a limit switch (not shown) senses the disc 1 loaded and inserted into the cartridge bracket 2. When the limit switch senses insertion of the disc 1, the loading motor 10 is started, and the power from the loading motor 10 is transmitted to the power transmission rack 4 through the worm gear 11 and the gear train 9. Accordingly, the power transmission rack 4 starts to move to the right from a position as shown in FIG. 3(a) facing the paper. That is, loading of the disc 1 is started.

As the power transmission rack 4 starts to move to the right facing the paper, the projection 3 of the cartridge guide bracket 2 moves slowly along the horizontal part of the slit 8 formed in the guide plate 7. And the projections 3 of the cartridge guide bracket 2 starts to move downward along the vertical part of the slits 8 formed in the guide plate 7 at the moment the center of a turntable 12 is matched with the center of the disc 1. At the end, as shown in FIG. 3(b), with the downward movement of the cartridge guide bracket 2 with the disc 1 inserted therein guided by of the sloped slits 5 of the power transmission rack 4 and the slits 8 of the guide plate 7 in combination, loading of the disc 1 can be completed.

Figure 3B:
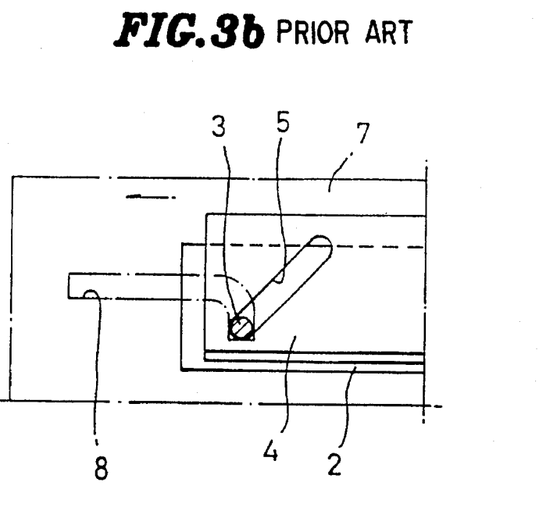

Opposite to the above case, upon starting of unloading, the loading motor rotates in the opposite direction, and the power transmission rack 4 moves from the position shown in FIG. 3(b) to the left facing the paper. When the power transmission rack 4 moves to the left as above, the projections 3 of the cartridge guide bracket 2, being pushed upward by the sloped slits 5, starts to move upward along the vertical part of the slits 8. The projections 3 of the cartridge guide bracket 2 after moving upward then moves along the horizontal parts of the slits 8 of the guide plate 7 to come to a condition as shown in FIG. 3(a). That is, unloading of the disc 1 is completed.

Figure 4:
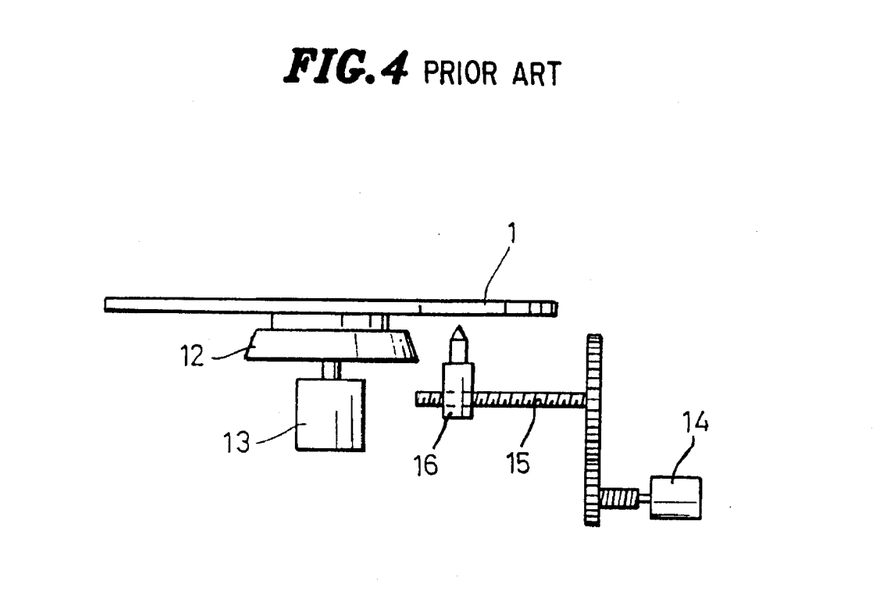
FIG. 4 is a longitudinal section of a conventional disc rotation part and a pick up operation part.

As shown in FIG. 4, the disc 1, thus completed loading, is set on a turntable 12 rotated by a spindle motor 13. Upon setting of the disc 1 on the turntable 12, a pick up 16 is operated by a lead screw 15 for detecting information recorded on the disc 1. The lead screw 15 is rotated by a pick up driving motor 14 provided at one side of the spindle motor 13 and gears engaged to an output side of the motor 14. And the pick up 16 for detecting information recorded on the disc 1, always positions on the center of the disc 1 at an initial stage.

When the pick up driving motor 14 is operated while the disc 1 set on the turntable 12 is rotating, the pick up 16 threaded on the lead screw 15, is moved in a circumferential direction, and successively reads in the information recorded on the disc 1.

Shown in FIG. 1 is a magnetic head operation part for recording information on a disc 1. A head mount 18 having a magnetic head 17 at the fore end is rotatably mounted on a guide bar 19. The head mount 18 can be maintained in an elevated condition when it does not record information on the disc 1 by a spring 20 set on the guide bar 19. An integrated loading bar 21 for pushing the guide bar 19 is provided at the end of the power transmission rack 4 that carries out loading and unloading of the disc 1.

Upon completion of disc loading by operating the loading motor 10, the loading motor is driven a little more for recording information on the disc 1. Upon driving the loading motor a little more, the loading bar 21 fixed to the power transmission rack 4 pushes to rotate the guide bar 19 biased by the spring 20. Due to this, the head mount 18 turns toward the disc 1 and the magnetic head 17 makes a close contact with the disc 1, thereby the magnetic head 17 can record information on the disc 1.

Unloading of the magnetic head 17 is carried out by the power transmission rack 4 drawn back by the loading motor 10 rotated in reverse direction, which makes the loading bar 21 come apart from the guide bar 19. That is, the head mount 18 comes apart from the disc by the restoring force of the spring 20.

However, the conventional device has the following various problems.

First, since a loading motor 10 for loading and unloading the disc and the magnetic head 17, and the pick up operation motor 14 for operating the pick up 16 are required separately, the product has high cost.

Second, due to the gear train used for moving the power transmission rack 4, the capacity of the loading motor 10 needs to be larger.

Third, since the gear train 9 and the loading motor 10 are positioned at one side of the guide plate 7, it is hard to make the product compact.

Fourth, since separate circuits for driving the loading motor 10 and the pick operation motor 14 are required, the product becomes complicated.

SUMMARY OF THE INVENTION

The object of this invention which is designed to overcome the disadvantages of the conventional driving device for a portable mini-disc player, is to make it possible to carry out loading and unloading of a disc, operation of the pick up, and loading and unloading of the magnetic head using only one motor.

These and other objects and features of this invention can be achieved by providing a driving device for a mini-disc player including, a driving part having a motor fixed on a deck and a gear train, a cam having a cam groove formed therein driven by the motor, a disc loading means having one end thereof inserted in the cam groove for varying its position following rotation of the cam, a pick up operation part for operating a pick up by the rotation of the cam continued after completion of the disc loading by the disc loading means, and a magnetic head loading part moved interlocked with the rotation of the cam.

BRIEF DESCRIPTION OF THE DRAWINGS

FIGS. 5(a) and 5(b) are plan views of a mini-disc player in accordance with this invention, wherein FIG. 5(a) shows an initial stage before loading a disc, and FIG. 5(b) shows a disc loading stage which has been completed.

FIGS. 9(a) and 9(b) are plan views showing operation of the disc loading part of FIG. 8, wherein FIG. 9(a) shows a stage of operation before loading a disc, and FIG. 9(b) shows a stage of operation at completion of loading.

FIGS. 11(a) and 11(b) explain operation stages of a toggle lever and a rotation plate applied to this invention, wherein FIG. 11(a) shows an initial stage of the toggle lever, and FIG. 11(b) shows a stage wherein the toggle lever has been rotated.

FIGS. 12(a) and 12(b) are perspective views showing operation stages of a rotation plate, wherein FIG. 12(a) shows a stage the head loading guide bar is off from the actuation piece, and FIG. 12(b) shows a stage the head loading guide bar is laid on the actuation piece.

FIGS. 14(a) and 14(b) are longitudinal sections showing operating stages of the magnetic head, wherein FIG. 14(a) is a stage where the magnetic head has been unloaded, and FIG. 14(b) is a stage where the magnetic head has been loaded.

DETAILED DESCRIPTION OF THE EMBODIMENT

This invention is now explained in detail, referring to FIGS. 5(a)–14(b) attached as one embodiment of this invention.

Figure 5A:
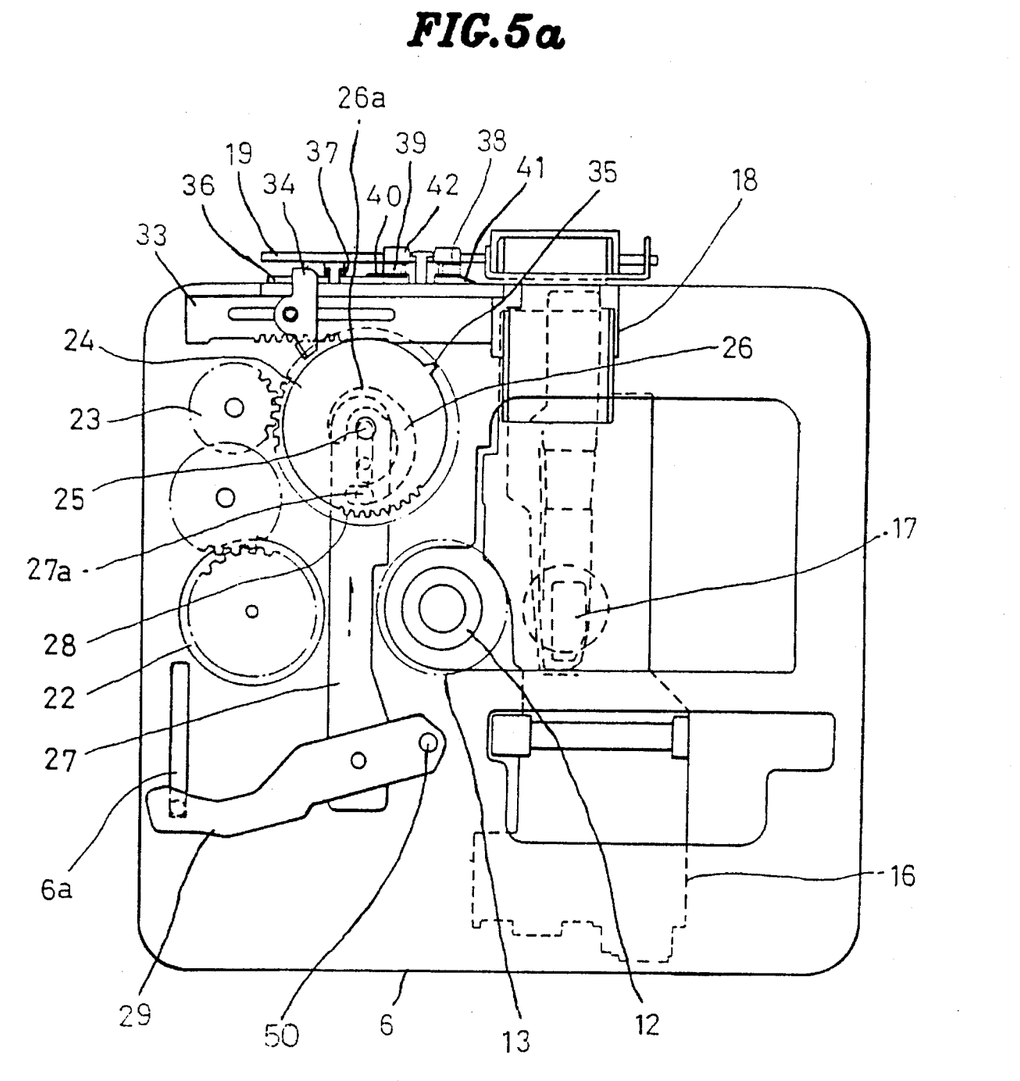
Figure 5B:
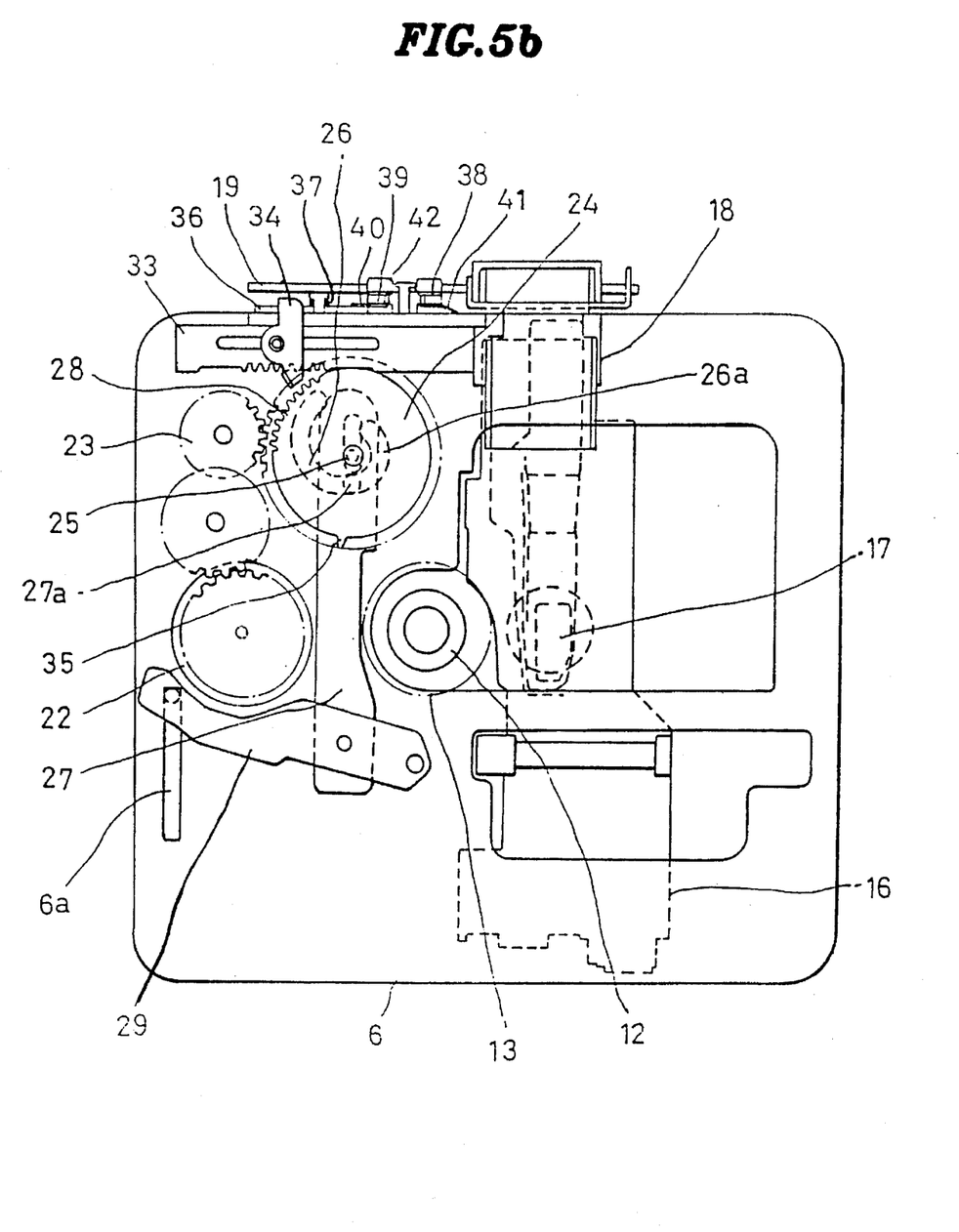

FIGS. 5(a) and 5(b) are plan views of a mini-disc player in accordance with this invention. The mini-disc player includes four principal parts including a disc loading part for loading and unloading a disc, a disc rotation part for rotating a disc of which has been loaded, a pick up transfer part for reproducing information recorded on the disc under the condition that the loading of the disc has been completed, and a magnetic head loading part for recording information on the disc under the condition that loading of the disc has been completed. Since the disc rotation part for rotating the disc under the condition that loading has been completed is the same with conventional players, its explanation is omitted. The same reference numbers as used for the conventional disc rotation part will be used.

By transmitting the rotating force of a motor 22 mounted on the deck 6 to a cam 24 through a plurality of follower gears 23, it is made possible to carry out disc loading, pick up operation, and magnetic head loading, successively.

Figure 6A:
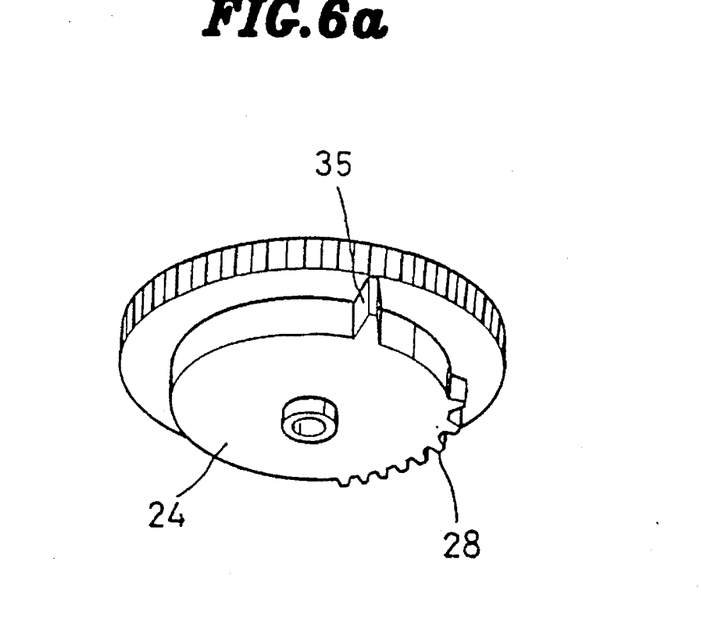
FIGS. 6(a) and 6(b) are perspective views respectively of a bottom view of a can and a plan view of the cam, a principal part of this invention.
Figure 6B:
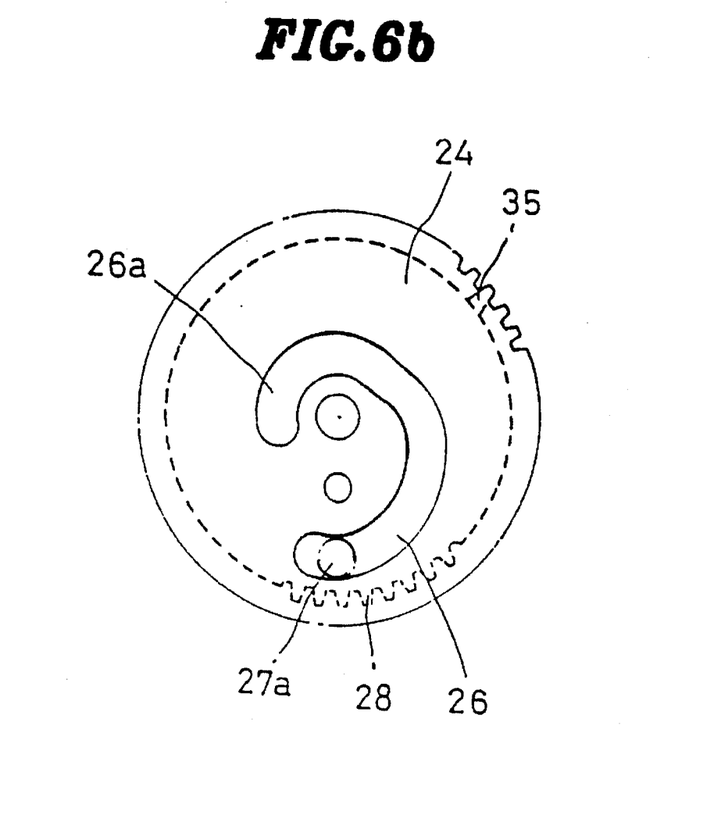

As shown in FIGS. 6(a) and 6(b), a cam 24, being a principal part of this invention, includes a cam groove 26 having a gradually varying distance to a center shaft 25 thereof. A projection 27a of a first disc loading lever 27 is inserted into the cam groove. The cam groove 26 has a concentric part 26a forming a concentric circle with the center shaft 25 of the cam 24 at the inner part of the cam 24. A part of the cam groove where the concentric circle starts corresponds to the loading completion point of a disc 1 and the concentric part 26a of the cam groove formed thereafter is formed for movement of the disc after completion of disc loading. And a partial gear 28 is formed around the circumference of the cam 24 for transfer of the pick up 16 at a time when the disc loading has been completed.

Figures 7A, 7B:
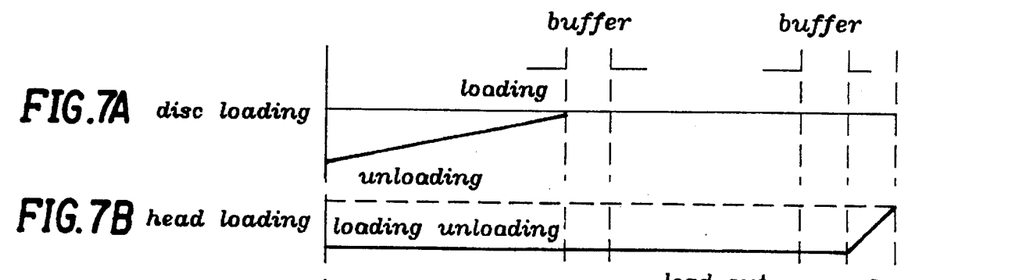
FIG. 7A–7C are graphs showing functions of a cam classified by sections of the rotating cam.
Figure 7C:
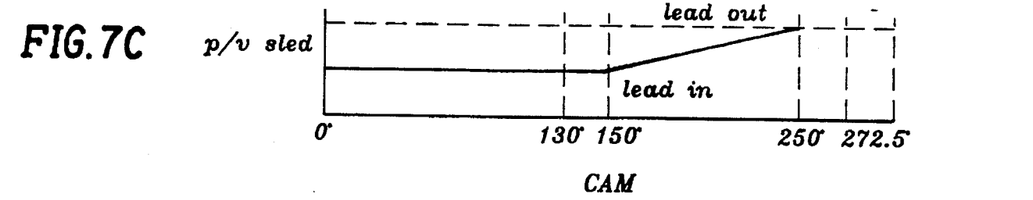

FIGS. 7A–7C are graphs showing functions of a cam classified by sections of the rotating cam. It is provided that the disc 1 is loaded while the cam 24 rotates up to 130 deg., i.e., rotates for the cam groove 26 section according to rotation of the motor 22. And, a buffer section wherein no operation is made is provided from the 130 deg. to the 150 deg. section of cam rotation. And the pick up 16 is made to be transferred from 150 deg. to 250 deg. section of cam rotation by the partial gear 28. The reason to provide the buffer section from the loading completion point to the pick up operation starting point is to make the operations distinctive from each other.

Figure 8:
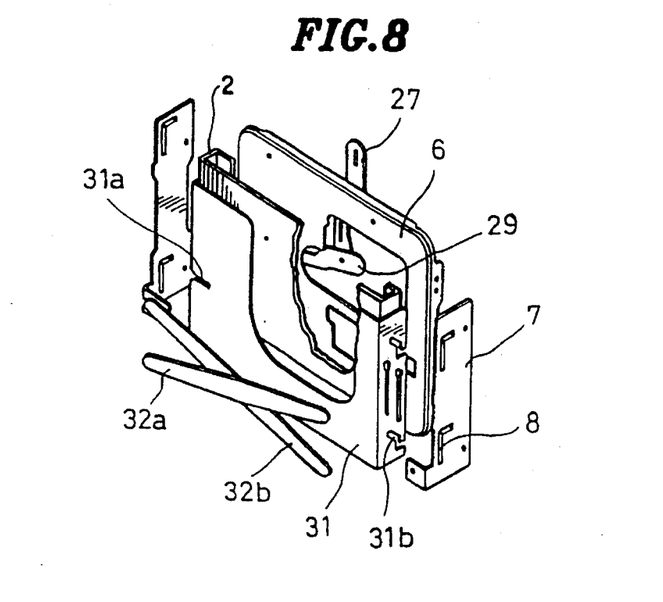
FIG. 8 is a disassembled perspective view of the disc loading part in accordance with this invention with the guide bracket 2 shown with a cutaway portion.

FIG. 8 is a disassembled perspective view of the disc loading part in accordance with this invention. As shown, a second disc loading lever 29 is provided having one end thereof linked with the first disc loading lever 27 and the other end connected with the guide bracket 2 through a long hole 6a formed in one side of the deck 6. Following rotation of the cam 24 at operation of the motor 22, the first disc loading lever 27 makes a linear movement in the direction of the disc 1 insertion and the second disc loading lever 29 makes a circular movement centered on the shaft 50. One pair of synchronization levers 32a and 32b are provided having one end of the synchronization lever 32a hinged on a moving plate 31 and one end of the synchronization lever 32b hinged on the deck 6. The one ends of the synchronization levers 32a and 32b hinged on the moving plate 31 and the deck 6 are connected to move along the horizontal holes 6b and 31a respectively. The purpose of this arrangement is for putting a uniform force on the guide bracket when the guide bracket moves to carry out loading and unloading of the disc 1 following the rotation of the cam 24.

The pick up operation part is operated when the stage loading stage of the disc 1 has been completed and the spindle motor 13 has started rotation of the disc 1. Operation of the pick up is made possible by the partial gear 28 formed on the outer circumference of the cam 24 for operation of the pick up 16 and a rack 33 formed on the pick up for engaging the partial gear 28. The concentric part 26a of the cam makes the loading lever, moved a certain distance by the initial rotation of the cam from 0 deg. to 130 deg. have no further force placed thereon.

Therefore, upon further movement of the cam 24 (after 150 deg.), since the projection 27a, positioned in the concentric part 26a, has no force placed thereon and the partial gear 28 formed on the cam 24 rotates engaged to the rack 33, the pick up 16 positioned at a inner part of the disc 1 starts to move toward the circumference of the disc 1.

Figure 10:
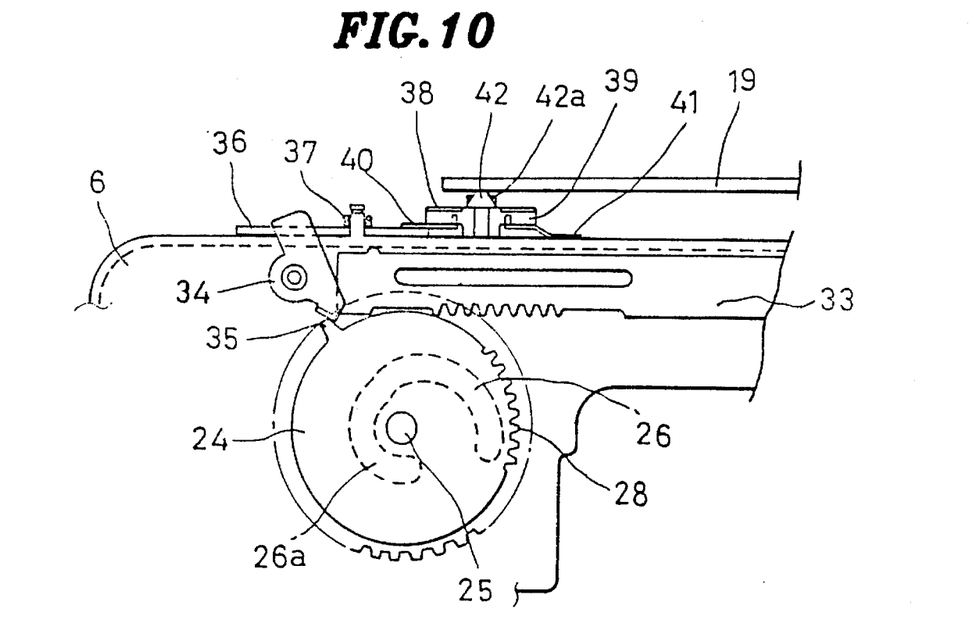
FIG. 10 is a plan view of a principal part of the magnetic head loading part in accordance with this invention.

The mini-disc player having the foregoing system is used for low priced popular products having only a reproduction function for reproducing information recorded on a disc. In order to use the system in a mini-disc player having both a reproducing function as well as a recording function for recording new information on the disc, a magnetic head loading part has to be provided. As shown in FIG. 10, an actuation lever 34 is rotatably connected under the deck 6 for operation of the disc loading part, the pick up operation part, and the magnetic head loading part successively according to the rotation of the cam 24. And a projection piece 35 is provided on the cam 24 for rotating the actuation lever 34 at a stage when the partial gear 28 comes out of the rack 33 completely, i.e., the pick up operation part has completed its operation. And a spring 37 biased toggle lever 36 is provided at the back of the deck 6 at 90 deg. to the actuation lever 34 for being rotated together with the rotation of the actuation lever 34. A rotation plate 38 is provided on one side of the toggle lever for being rotated only in one direction by the toggle lever, and a guide bar 19 is provided at one side of the rotation plate for causing the magnetic head to contact with and come apart from a disc. The rotation plate 38 is permitted to rotate only in one direction by catching members at the time of rotation of the toggle lever 36.

Figure 11A:
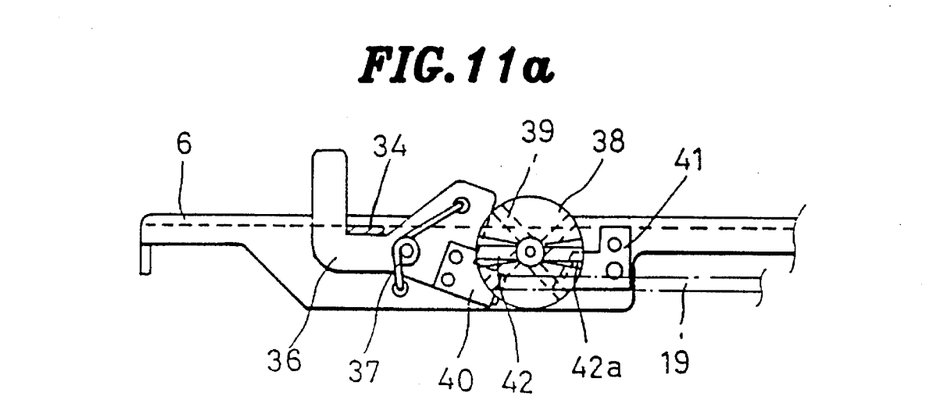
Figure 11B:
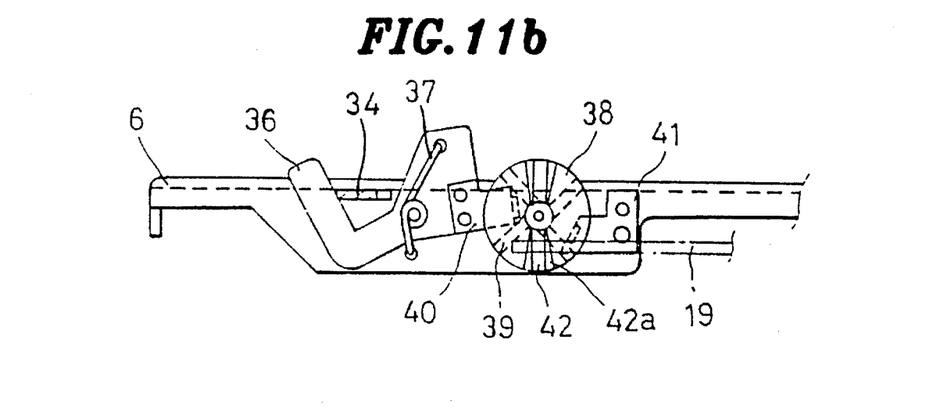
Figure 12A:
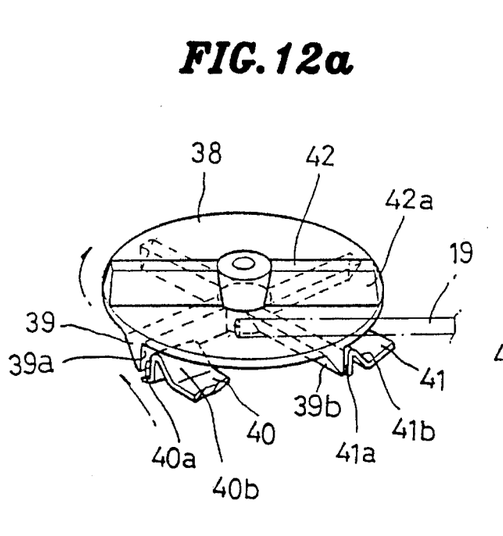
Figure 12B:
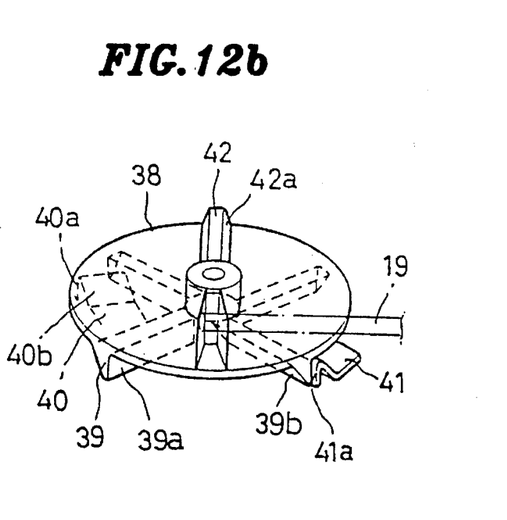
Figure 13A:
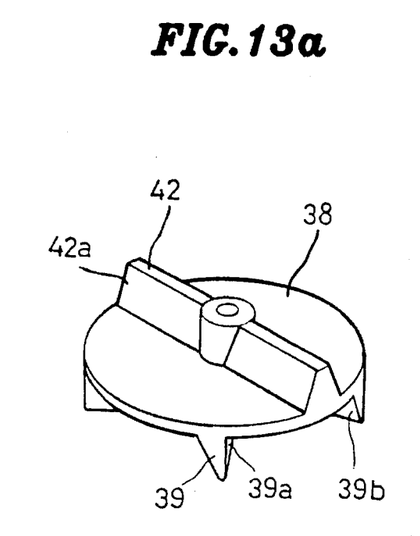
FIGS. 13(a) and 13(b) are perspective views of a rotation plate.
Figure 13B:
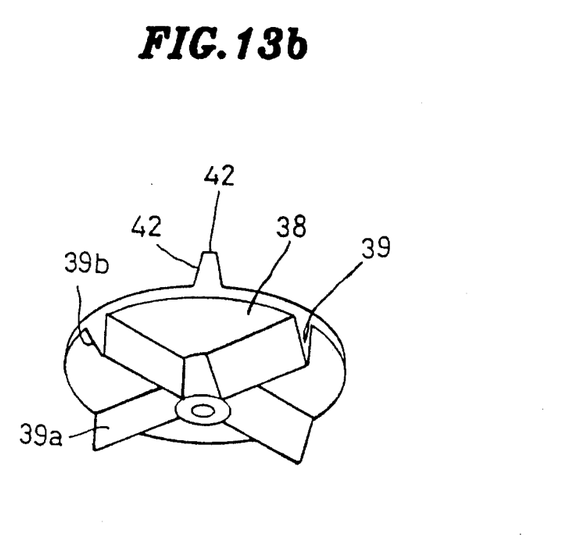

The attached drawings of FIGS. 11(a) and 11(b) explain operation of the toggle lever and the rotation plate, FIGS. 12(a) and 12(b) are perspective views showing operation of the rotation plate, and FIGS. 13(a) and 13(b) are perspective views of the rotation plate. As can be seen from above drawings, the rotation plate, rotating in contact with the guide bar 19, changes the position of the guide bar. Projection pieces 39 each having a sloped surface 39b and a vertical surface 39a are provided on an underside of the rotation plate 38 at 90 deg. apart from one another. Catching members of plate springs 40 and 41 each having a sloped surface 40b and 41b and a vertical surface 40a and 41a are fixed at the end of the toggle lever 36 and the deck 6 so as to position between pairs of the projection pieces 39.

Due to this, at rotation of the toggle lever 36, the rotation plate 38 rotates at 90 deg. by the vertical surface 40a of the plate spring 40 fixed to the toggle lever 36 and one of the vertical surfaces 39a of the projection pieces 39 formed on the rotation plate 38. In this instant, the sloped surfaces 39b of the projection pieces 39 slide over the plate spring 41 fixed on the deck 6 along the sloped surface 41 thereof. Of course, since the vertical surface 41a of the plate spring 41 fixed on the deck 6 makes contact with one of the vertical surfaces 39a of the projection pieces 39, the rotation plate 38 does not rotate in the other direction.

On the other hand, as shown in FIGS. 13(a) and 13(b), one pair of guide bar actuation pieces 42 each having a sloped surface 42a is formed on upper surface of the rotation plate 38, i.e., at the opposite side of the surface the projection pieces 39 are provided thereon. The guide bar 19 lies on one of the actuation pieces, selectively. A detection switch 43 is provided at a lower end of the head mount 18 to inform the user of the contact and the coming apart of the magnetic head with and from the disc 1 through a control part.

The spring constant of the spring 37 restoring the toggle lever 36 is greater than that of the plate spring 40 fixed on the toggle lever 36. This is so that the toggle lever 36 will reverse ride over one of the slopes 39b of the projection pieces 39 while not being deformed and rotate the rotation plate 38 when the toggle lever 36 comes back as a result of the restoring force of the spring 37.

A buffer section is also provided between the pick up operation completion point and the magnetic head loading starting point like the buffer section between the disc loading completion point and the pick up operation starting point. That is, as shown in FIG. 7, until the cam 24 rotates 250 deg., information recorded on the disc 1 is reproduced while the partial gear 28 is rotating engaged with the rack 33. Then, a buffer section, during which no operation is carried out, is provided up to 272.5 deg., and thereafter a section rotating the actuation lever 34 by the projection piece 35 is provided.

Operation and effect of the foregoing mini-disc player having reproduction and recording functions in accordance with this invention will now be explained.

Figure 14A:
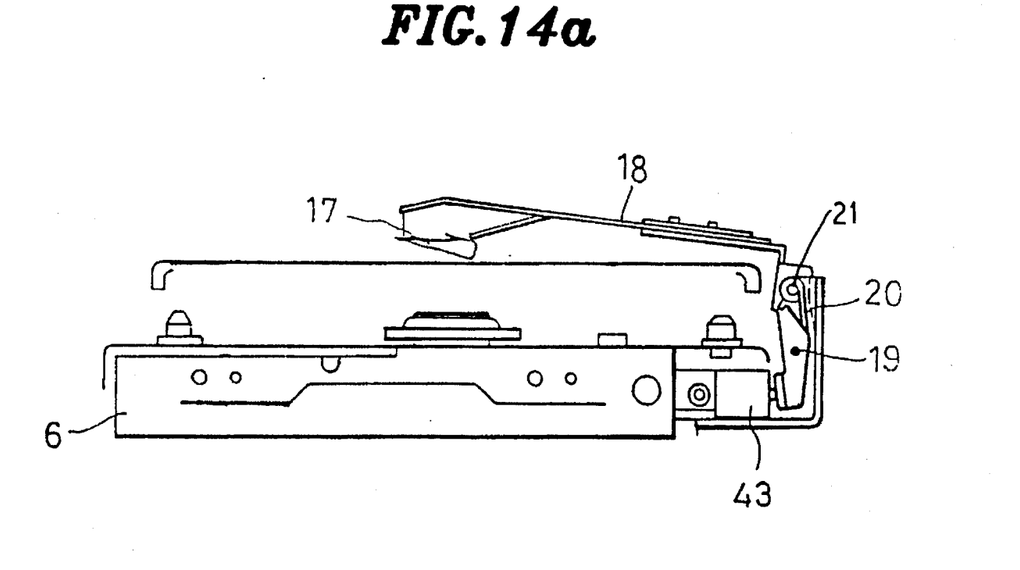

In an initial stage of loading when a disc has not been loaded, the mini-disc player is in a condition that the guide bracket has been drawn out to the insertion side, the pick up 16 has been moved to an inner side of the turntable 12, and the head mount 18 having the magnetic head 17 fixed thereto is in an elevated condition as shown in FIG. 14(a).

Under such a condition, when a disc 1 is loaded in the guide bracket from the front, a sensor(not shown), sensing the presence of disc, operates the motor 22. Then the driving force of a motor 22, transmitted through the follower gear 23 under a condition as shown in FIG. 5(a), rotates the cam 24 engaged to the follower gear. When the cam 24 is rotated in clockwise direction, since the projection 27a inserted in the cam groove 26 moves toward the center shaft 25 along the cam groove 26, the first disc loading lever 27 having the projection 27a provided thereon is moved in a direction shown by the arrow. As such, when the first disc loading lever 27 is moved in the arrow direction, the second disc loading lever 29 linked with the first disc loading lever makes a circular movement guided by the long hole 6a. At the end, the guide bracket linked with the second disc loading lever 29 is moved toward an inner side of the deck 6. When the guide bracket is moved toward the inner side of the deck 6, the projections provided at both sides of the guide bracket are moved along the slits 8 of the guide plate 7 in a condition the projections are inserted in the sloped slits 31b of the moving plate 31. The projections provided at both sides of the guide bracket causes horizontal movement until the center of the disc coincides with the center of the turntable 12 where the projections drops along vertical parts of the slits 8 by the sloped slits 31*b*. At the end, loading of the disc is completed as shown in FIG. 5(*b*).

Figure 9A:
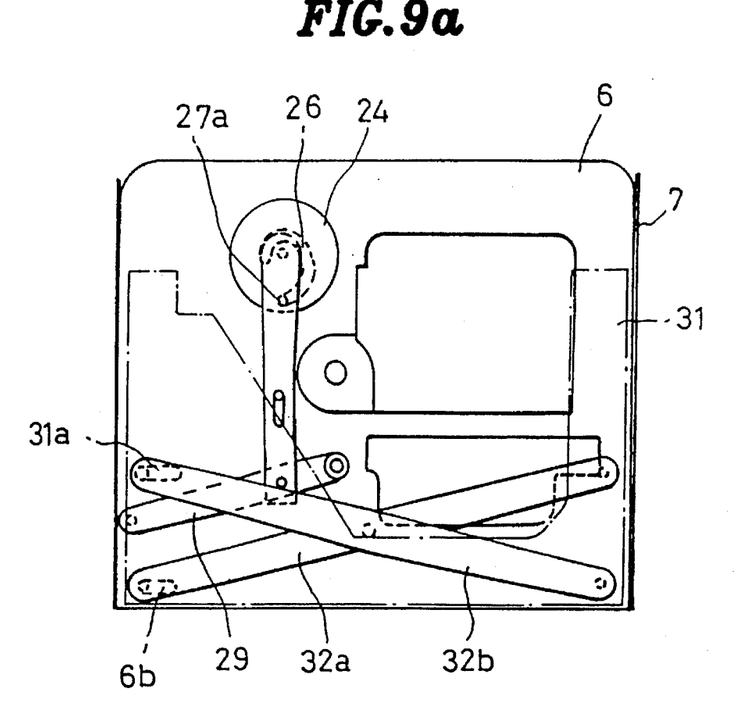
Figure 9B:
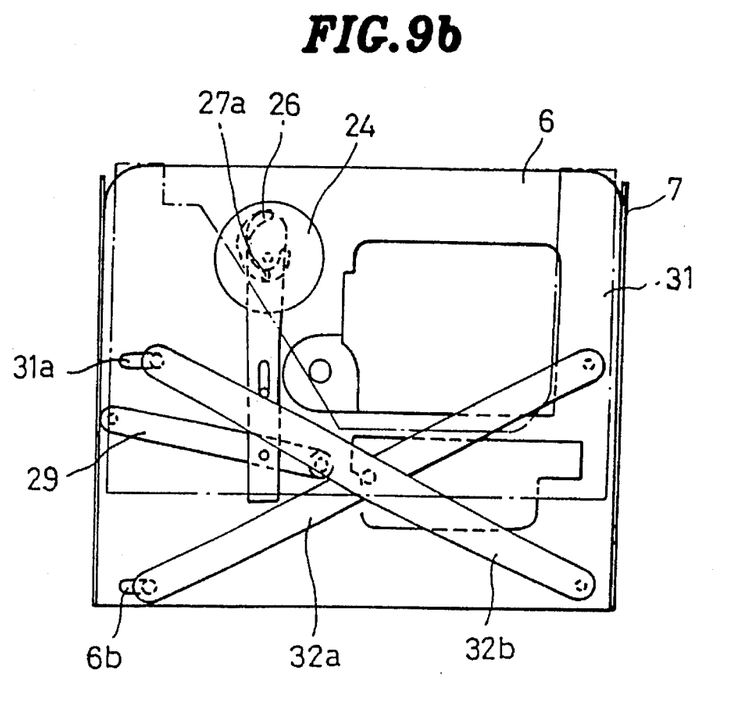

In this instant, the synchronization levers 32*a* and 32*b*, moved closer together as shown in FIG. 9(*a*), are opened as shown in FIG. 9(*b*) as the moving plate 31 is moved toward the inner side of the deck 6. Since the synchronization levers distribute the uneven force exerted by the first and the second disc loading levers 27 and 29 evenly, smooth loading operation of the disc can be made. Since one of the ends of each of the synchronization levers 32*a* and 32*b* are moved along the horizontal holes 6*b* and 31*a* when the synchronization levers 32*a* and 32*b* are opened after the disc loading has been completed as shown in FIG. 9(*b*), variation of position of the guide bracket due to the movement of the synchronization levers 32*a* and 32*b* can be compensated. As has been explained, the range of rotation of the cam 24 for loading the disc is up to a time when the projection 27*a* provided on the first disc loading lever 27 has reached the end of the cam groove 26. That is, as shown in FIG. 7, it is a stage of initial cam operation where the cam 24 rotates from 0 deg., to 130 deg. As such, when the rotating cam 24 carries out loading of the disc 1, the pick up 16 is at standstill condition because the partial gear 28 provided on the cam 24 is not engaged to the rack 33. While the cam 24 rotates from 130 deg. to 150 deg. as shown in FIG. 7 under a condition that the disc loading has been completed, no parts are driven by the cam 24 because the range is a buffer section. When the cam 24 begins to pass 150 deg. thereafter, the partial gear 28 provided on the cam 24, is engaged to the rack 33, makes the pick up 16 moved toward the circumferential direction of the disc 1 for the pick up 16 to reproduce information recorded on the disc 1.

As has been explained, when the pick up has reproduced information recorded on a disc, the mode is changed over to reduce the speed of the motor 22, and under a seek mode in which the pick up is positioned for search of recorded information, the pick up 16 is transferred rapidly by running the motor 22 at the same speed as with the case of disc loading. In this instant, since the projection 27*a* provided on the first disc loading lever 27 is positioned within the concentric part 26*a* connected to the cam groove 26, the first disc loading lever 27 is not moved. When it is desired to record the new information on the disc under a condition that the disc has been loaded, the pick up 16 is transferred rapidly in circumferential direction the same as with the case of foregoing the seek mode.

Then, as shown in FIG. 7, when the cam 24 has been rotated still further to reach to 272.5 deg., since the projection piece 35 provided on the cam 24 makes contact with the actuation lever 34 as shown in FIG. 10, the actuation lever is rotated in a counter clockwise direction. When the cam 24 is rotated within the buffer section of from 250 deg. to 272.5 deg. just before the projection piece 35 makes the actuation lever 34 rotate, the cam 24 works nothing. As has been described, upon rotation of the actuation lever 34 in a counter clockwise direction, the toggle lever 36 positioned as shown in FIG. 11(*a*) by the spring force of the spring 37 is rotated as shown in FIG. 11(*b*) as much as the rotation range of the cam 24 permits while unrolling the spring 37. Of course, rotation of the cam 24 is interrupted. Since the interruption of rotation of the cam 24 can be made possible with separate sensing means such as a limit switch, the drawing together with the explanation is omitted herein.

As such, when the toggle lever 36 is rotated, since the plate spring 40 fixed at the end of the toggle lever 36 makes contact with one of the projection pieces 39 by both of the vertical surfaces thereof 40*a* and 39*a* respectively, the rotation plate 38 is rotated at 90 deg. Since the other plate spring 41 fixed on the deck 6 between one pair of the projection pieces 39 makes contact with one of the projection pieces 39 through the sloped surfaces 41*b* and 39*b*, both of them do not interfere with each other at rotation of the rotation plate 38. After the rotation plate is rotated at 90 deg., since one of the projection pieces 39 makes contact with the plate spring 41 fixed on the deck 6 by both of the vertical surfaces 39*a* and 41*a* thereof respectively, reverse rotation of the rotation plate is prevented.

Figure 14B:
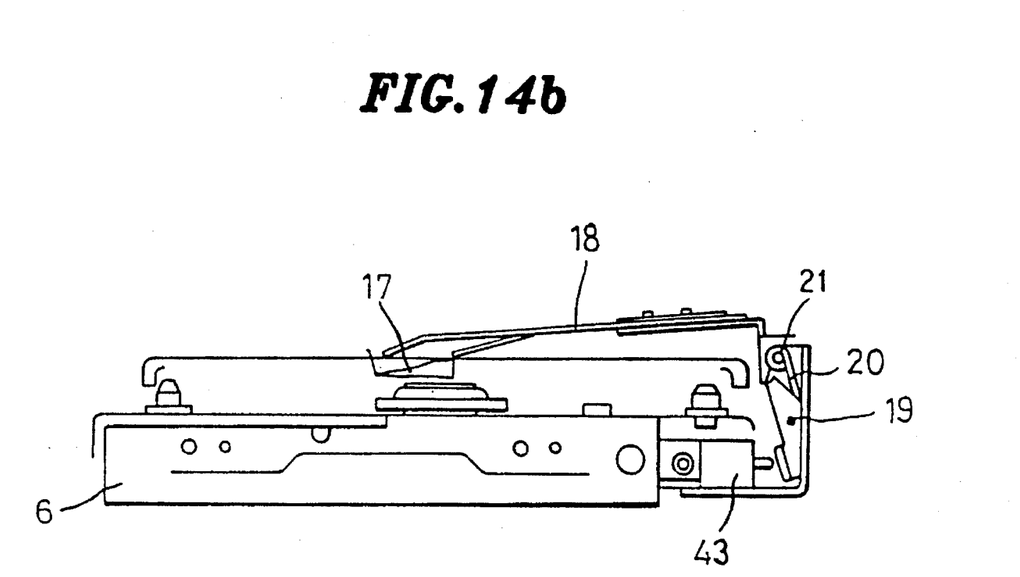

Upon rotation of the rotation plate 38 at 90 deg., since the guide bar 19, laid on the upper surface of the rotation plate 38 off the actuation pieces 42 provided on the upper surface of the rotation plate 38 as shown in FIG. 12(*a*), is elevated riding along the sloped surface 42*a* of the actuation piece 42 to become laid on one of the actuation pieces 42 as shown in FIG. 12(*b*) and at the same time pivoted about hinge 21 as shown in FIG. 14(*a*) and FIG. 14(*b*), the head mount 18 which was separated from the disc 1 as a result of the spring force of the spring 20 as shown in FIG. 14(*a*) compresses the spring 20, causing it to move downward thereby causing the magnetic head 17 to make contact with the disc 1. That is, the loading of the magnetic head 17 is completed. As such, when the head mount 18 is rotated, the detection switch 43 is operated by the lower end of the head mount 18, informing the user through the control part of the loading condition of the magnetic head 17. In this instant, since the projection 27*a* provided on the first disc loading lever 27 is at the end of the concentric part 26*a* connected to the cam groove 26, the first and the second loading levers 27 and 29 are not moved. As such, upon reversing the cam 24 by reversing the motor 22 after loading of the magnetic head 17 by rotating the cam 24, the projection piece 35 provided on the cam 24 comes apart from the actuation lever 34. When the projection piece 35 comes apart from the actuation lever 34, though the toggle lever 36, having been rotated while unrolling the spring 37 by the actuation lever 34, is returned to a condition as shown in FIG. 11(*a*), the rotation plate 38 is not rotated in counter clockwise direction but maintains the present standstill condition. That is, when the plate spring 40 fixed at the end of the toggle lever 36 is restored, since the contact of the vertical surface 41*a* of the plate spring 41 fixed on the deck 6 with one of the vertical surfaces 39*a* of the projection pieces 39 provided on the rotation plate 38 prevents the rotation plate from reversing, the sloped surface 40*b* of the plate spring fixed on the toggle lever 36, being rotated in a counter clockwise direction along another one of the sloped surfaces 39*b* of the projection pieces 39, can be returned to initial position. As seen in the foregoing description, though the toggle lever 36 is returned to initial condition, since the magnetic head 17 can maintain loaded condition by the guide bar 19 laid on the upper surface of one of the actuation pieces 42 provided on the rotation plate 38, it is possible to record information on a disc by operating the pick up operation part in the same way as the case of reproduction.

After completion of recording according to the foregoing operation, when the projection piece 35 provided on the cam 24 rotates the actuation lever 34 in counter clockwise direction, since the toggle lever 36 rotates the rotation plate 38 at 90 deg., the guide bar 19 laid on one of the actuation pieces 42, comes from the actuation piece 42 and is laid on the upper surface of the rotation plate 38. According to this, the head mount 18 lowered while compressing the spring 20 is restored to return to and maintain its initial condition.

This invention explained above has following advantages:

First, production costs can be reduced because the loading and unloading of a disc, the pick up operation, and loading and unloading of a magnetic head can be carried out using only one motor 22.

Second, it becomes possible to make a mini-disc player compact because the mechanism for carrying out loading and unloading of a disc can be positioned inner side of a deck.

Third, the system of the device can be simplified because no additional circuit for driving a separate pick up driving motor is required.

Fourth, a distinctive sectional operation can be made possible without any addition of circuits because buffer sections are provided between sections of loading and unloading of a disc, pick up operation, and loading and unloading of a magnetic head.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A driving device for a mini-disc player comprising:

a driving part having a motor fixed on a deck and connected to a gear train;

a cam having cam groove formed therein driven by the motor through the gear train;

a disc loading means having one end thereof inserted in the cam groove for varying the position of the disc loading means by following rotation of the cam;

a pick up operation part for operating a pick up according to the rotation of the cam continued after completion of the disc loading by the disc loading means; and a magnetic head loading part moved interlocked with the rotation of the cam, wherein the magnetic head loading part includes, an actuation lever rotatably coupled to the deck, a projection piece provided at an underside of the cam for rotating the actuation lever under the condition that the pick up operation has been completed, a toggle lever spring mounted at one end of the deck for moving interlocked with the rotation of the actuation lever, a rotation plate for rotating in one direction according to the rotation of the toggle lever, a guide bar for selectively coming off from actuation pieces on an upper surface of the rotation plate according to the rotation of the rotation plate, and catching members for restricting the rotation plate so that the rotation plate rotates only in one direction.

2. The driving device for a mini-disc player as claimed in claim 1, wherein the disc loading means includes, a first disc loading lever having a projection inserted in the cam groove for changing the position of the disc loading lever according to rotation of the cam, a second disc loading lever rotatably coupled to a point on the first disc loading lever intermediate the ends of the first disc loading lever for being rotated as the first disc loading lever changes position, and a guide bracket rotatably coupled to the second disc loading lever through a long hole provided in the deck.

3. The driving device for a mini-disc player as claimed in claim 2, wherein the guide bracket has a moving plate positioned above the guide bracket, the moving plate is rotatably connected to one end of one pair of synchronization levers, and the other end of the pair of synchronization levers is rotatably connected to the deck.

4. The driving device for a mini-disc player as claimed in claim 2, wherein the pick up operation part includes, a partial gear provided at the underside of the cam, and a rack fixed at one end of the pick up for engaging the partial gear after completion of loading of a disc.

5. The driving device for a mini-disc player as claimed in claim 4, wherein buffer sections caused by non-toothed sections of the cam gear are provided at the points of disc loading completion and pick up operation starting.

6. The driving device for a mini-disc player as claimed in claim 5, wherein the partial gear is provided to engage to the rack under the condition that the projection of the first disc loading lever has passed a concentric part, wherein the concentric part forms a concentric circle with a center shaft of the cam groove.

7. The driving device for a mini-disc player as claimed in claim 1, wherein the catching members include, projection pieces formed at 90 deg. apart at an underside of the rotation plate each having a sloped surface and a vertical surface, and plate springs provided on the toggle lever and the deck to position between pairs of the projection pieces, each of said plate springs having a sloped surface and a vertical surface.

8. The driving device for a mini-disc player as claimed in claim 7, wherein one pair of guide bar actuation pieces each having a sloped surface are provided on the upper surface of the rotation plate for making the guide bar come off from or lie on an upper surface of one of the actuation pieces.

9. The driving device for a mini-disc player as claimed in claim 7, wherein a spring constant of a spring mounted biased on the toggle lever is greater than a spring constant of one of the plate springs fixed at one end of the toggle lever.

10. The driving device for a mini-disc player as claimed in claim 9, wherein the projection pieces are arranged such that one of the projection pieces makes contact with the actuation lever after the partial gear provided on the cam has completely come off the rack.

11. The driving device for a mini-disc player as claimed in claim 1, wherein buffer sections caused by non-toothed sections of the cam gear are provided at the points of pick up completion and magnetic head loading starting.

* * * * *